(12) United States Patent
Yamagishi (10) Patent No.: US 7,129,817 B2
(45) Date of Patent: Oct. 31, 2006

(54) APPARATUS FOR CONTROLLING ARTICLES IN CUSTODY

(75) Inventor: Junichi Yamagishi, c/o Unirec Co., Ltd., 6-3, 2-chome, Kaminarimon, Taito-ku, Tokyo (JP) 111-0034

(73) Assignees: Unirec Co., Ltd., Tokyo (JP); Junichi Yamagishi, Tokyo (JP)

(*) Notice: Subject to any disclaimer, the term of this patent is extended or adjusted under 35 U.S.C. 154(b) by 328 days.

(21) Appl. No.: 10/210,722

(22) Filed: Aug. 1, 2002

(65) Prior Publication Data

US 2004/0021551 A1 Feb. 5, 2004

(51) Int. Cl.
*G08B 29/00* (2006.01)
*G06T 1/00* (2006.01)

(52) U.S. Cl. .................... 340/5.53; 340/5.71
(58) Field of Classification Search ............. 340/5.83, 340/545.6, 5.73, 5.9, 5.52–5.53, 5.42, 5.71
See application file for complete search history.

(56) References Cited

U.S. PATENT DOCUMENTS

| | | | | |
|---|---|---|---|---|
| 4,595,922 A | * | 6/1986 | Cobb et al. | 340/825.49 |
| 4,630,110 A | * | 12/1986 | Cotton et al. | 348/153 |
| 4,661,806 A | * | 4/1987 | Peters et al. | 340/568.1 |
| 4,768,021 A | * | 8/1988 | Ferraro | 340/568.1 |
| 4,993,068 A | * | 2/1991 | Piosenka et al. | 713/186 |
| 5,091,713 A | * | 2/1992 | Horne et al. | 340/541 |
| 5,337,043 A | * | 8/1994 | Gokcebay | 340/5.67 |
| 5,386,462 A | * | 1/1995 | Schlamp | 379/93.12 |
| 5,389,919 A | * | 2/1995 | Warren et al. | 340/5.31 |
| 6,344,796 B1 | * | 2/2002 | Ogilvie et al. | 340/568.1 |

FOREIGN PATENT DOCUMENTS

| | | |
|---|---|---|
| JP | 2-236695 | 9/1990 |
| JP | 4-85466 | 3/1992 |
| JP | 4-194285 | 7/1992 |
| JP | 5-14440 | 2/1993 |
| JP | 5-321531 | 12/1993 |
| JP | 6-14378 | 2/1994 |
| JP | 6-133068 | 5/1994 |
| JP | 8-273051 | 10/1996 |
| JP | 10-280763 | 10/1998 |

* cited by examiner

*Primary Examiner*—Jeffery Hofsass
*Assistant Examiner*—Kimberly Jenkins
(74) *Attorney, Agent, or Firm*—Jordan and Hamburg LLP (57) ABSTRACT

An apparatus for reliably and easily controlling articles in custody, for example articles in a safe, has a storage unit lockable to keep the articles therein and unlockable to allow the articles to be taken out therefrom, an input unit to input biometric information for unlocking the storage unit, a registration unit to register biometric information in advance, a collator to collate the input biometric information with the registered biometric information, a controller to unlock the storage unit if the collation by the collator authenticates the input biometric information, and a recorder to record at least a person related to the authenticated biometric information in response to the unlocking of the storage unit.

6 Claims, 10 Drawing Sheets

APPARATUS FOR CONTROLLING ARTICLES IN CUSTODY

BACKGROUND OF THE INVENTION

1. Field of the Invention

The present invention relates to an apparatus for controlling articles in custody, such as articles kept in a safe or a vault.

2. Description of the Related Art

An example of an apparatus for controlling articles in custody is disclosed in Japanese Patent Laid Open Publication No. 6-133068. This disclosure effectively prevents the theft of articles kept in a safe. The disclosure provides a safe with an electronic lock to lock and unlock the safe with electric signals and a cylinder lock to mechanically lock and unlock the safe with a key. The cylinder lock is unlockable to open the door of the safe only after unlocking the electronic lock. A control center transmits a command to the safe through a telephone line. A detector provided for the safe detects the command, and the electronic lock is locked or unlocked in response to the command. Namely, the safe is remotely controlled.

Such remote control has a problem that the safe is unlockable only in response to a command from the remote control center, to force troublesome operations when the safe must frequently be opened and closed by a plurality of persons.

SUMMARY OF THE INVENTION

An object of the present invention is to provide an apparatus for controlling articles in custody, capable of enabling a plurality of persons to open and close a safe at any time and securely controlling articles in custody.

A first aspect of the present invention provides an apparatus for controlling articles in custody, having a storage unit lockable to keep the articles therein and unlockable to allow the articles to be taken out therefrom, an input unit to input biometric information for unlocking the storage unit, a registration unit to register biometric information in advance, a collator to collate the input biometric information with the registered biometric information, a controller to unlock the storage unit if the collation by the collator authenticates the input biometric information, and a recorder to record at least a person related to the authenticated biometric information in response to the unlocking of the storage unit.

In the apparatus of the first aspect, a second aspect of the present invention makes the recorder also record a time when the storage unit is unlocked.

In the apparatus of any one of the first and second aspects, a third aspect of the present invention employs a safe as the storage unit.

In the apparatus of the third aspect, a fourth aspect of the present invention provides the safe with a lockable safe door and a plurality of inner storage spaces each being lockable to keep articles therein and selectively unlockable to allow the articles to be taken out therefrom. The input unit consists of an outer input unit to input biometric information for unlocking the safe door and an inner input unit to input biometric information for unlocking the inner storage spaces. Also provided is a selector to select any one of the inner storage spaces. The controller consists of an outer controller to unlock the safe door if the biometric information inputted into the outer input unit is authenticated by collation and an inner controller to unlock the selected inner storage space if the biometric information inputted into the inner input unit is authenticated by collation and if there is the inner storage space selected through the selector.

In the apparatus of any one of the first and second aspects, a fifth aspect of the present invention provides the storage unit with a photograph unit to photograph the articles in the storage unit and an image recorder to record images taken by the photograph unit when the storage unit is unlocked.

In the apparatus of any one of the first and second aspects, a sixth aspect employs a key storage unit as the storage unit. The key storage unit is lockable to separately keep keys and is selectively unlockable to allow a selected one of the keys to be taken out. Also provided is a key selector to select any one of the keys kept in the key storage unit. The controller selectively unlocks the key storage unit for the selected key if the biometric information inputted into the input unit is authenticated by collation and if there is the key selected through the key selector.

In the apparatus of the sixth aspect, a seventh aspect of the present invention makes the recorder also record a type of the key taken out after the unlocking of the key storage unit.

According to the first aspect, the storage unit is lockable to keep articles therein and is unlockable to allow the articles to be taken out therefrom. The input unit is used to input biometric information for unlocking the storage unit. The registration unit registers biometric information in advance. The collator collates the input biometric information with the registered biometric information. The controller unlocks the storage unit if the collation by the collator authenticates the input biometric information. The recorder records at least a person related to the authenticated biometric information in response to the unlocking of the storage unit.

The storage unit is unlockable by inputting biometric information without transmitting a command thereto. Any authorized person is allowed to unlock the storage unit at any time and take articles out of the storage unit. When the storage unit is unlocked by a person authenticated by collation, the person is recorded so that one may easily know who unlocked the storage unit. This realizes the secure management of the articles kept in the storage unit.

In addition to the effects of the first aspect, the second aspect makes the recorder also record a time when the storage unit is unlocked, so that one may easily know when and by whom the storage unit was unlocked. This improves the secure management of the storage unit.

In addition to the effects of the first and second aspects, the third aspect employs a safe as the storage unit and surely controls articles kept in the safe.

In addition to the effects of the third aspect, the fourth aspect provides the safe with a lockable safe door and a plurality of inner storage spaces each lockable to keep articles therein and selectively unlockable to allow the articles to be taken out therefrom. The fourth aspect forms the input unit with an outer input unit to input biometric information for unlocking the safe door and an inner input unit to input biometric information for unlocking the inner storage spaces. The selector of the fourth aspect allows an authorized person to select any one of the inner storage spaces to open. The fourth aspect forms the controller with an outer controller to unlock the safe door if the biometric information inputted into the outer input unit is authenticated by collation and an inner controller to unlock the selected inner storage space if the biometric information inputted into the inner input unit is authenticated by collation and if there is the inner storage space selected through the selector.

A registered or authorized person inputs his or her biometric information and opens the safe door. Thereafter, the person inputs the biometric information, selects one of the inner storage spaces, and opens the selected inner storage space. This arrangement more securely controls the safe.

In addition to the effects of the first and second aspects, the fifth aspect employs a photograph unit to photograph articles in the storage unit and an image recorder to record images taken by the photograph unit when the storage unit is unlocked. The fifth aspect uses the images to confirm articles taken out of the storage unit and the person who took out the articles.

In addition to the effects of the first and second aspects, the sixth aspect employs a key storage unit as the storage unit. The key storage unit is lockable to separately keep keys and is selectively unlockable to allow a selected one of the keys to be taken out. Also provided is a key selector to select any one of the keys kept in the key storage unit. The controller selectively unlocks the key storage unit for the selected key if biometric information inputted into the input unit is authenticated by collation and if there is the key selected through the key selector An authorized or registered person inputs his or her biometric information, selects one of the keys in the key storage unit, and takes the selected key out of the key storage unit. According to the sixth aspect, one may easily know which key was taken out by whom and when. Accordingly, the keys are securely managed.

In addition to the effects of the sixth aspect, the seventh aspect makes the recorder also record the type of a key taken out of the key storage unit.

The seventh aspect allows one to confirm which key was taken out by whom and when, to securely manage the keys kept in the key storage unit.

DETAILED DESCRIPTION OF EMBODIMENTS

Figure 1:
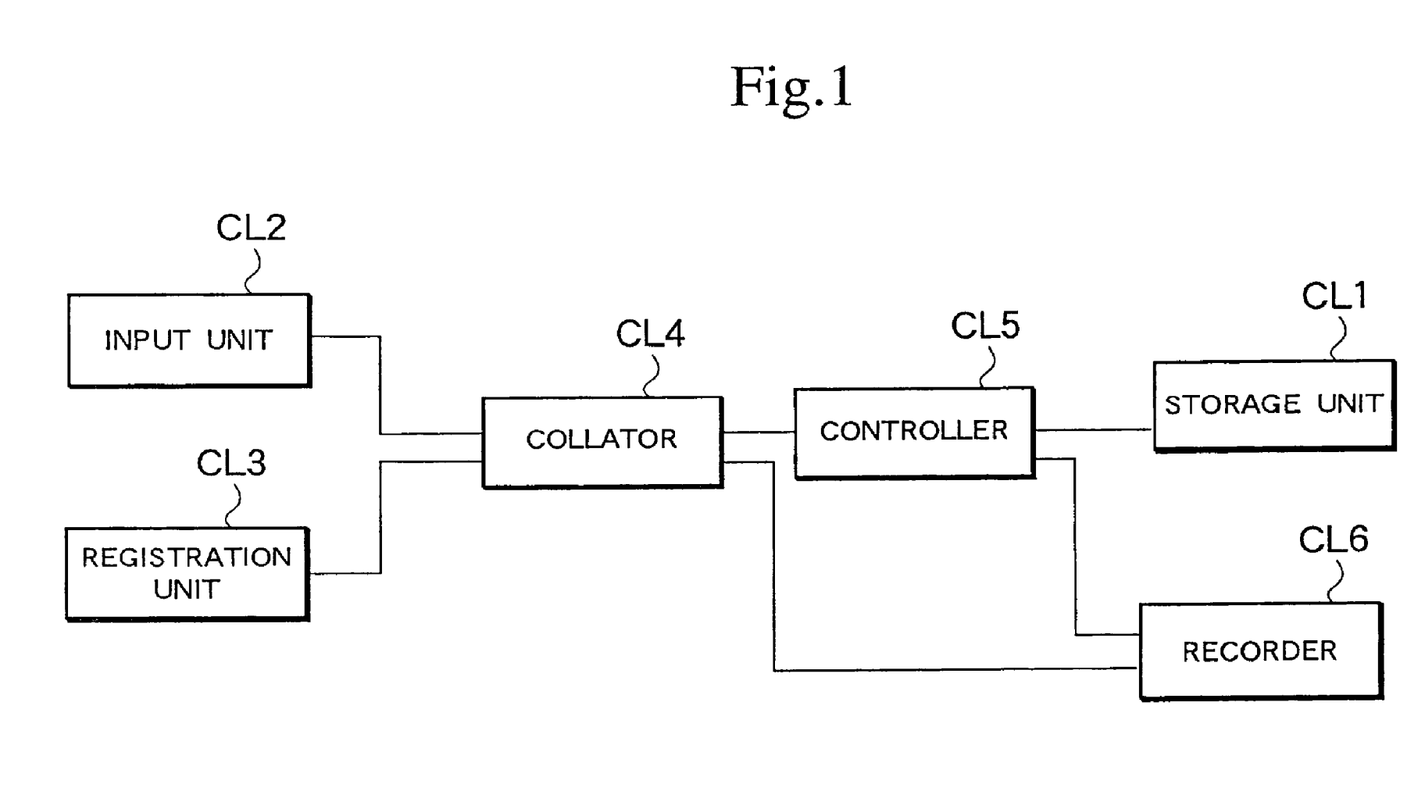
FIG. 1 is a block diagram showing a basic arrangement of an apparatus for controlling articles in custody according to the present invention.

FIG. 1 is a block diagram showing a basic arrangement of an apparatus for controlling articles in custody according to the present invention. The apparatus includes a storage unit CL1, an input unit CL2 for inputting biometric information, a registration unit CL3 for registering biometric information, a collator CL4 for collating biometric information, a controller CL5 for controlling the unlocking of the storage unit CL1, and a recorder CL6.

The storage unit CL1 has, for example, an electronic lock and keeps articles therein. The articles can be taken out of the storage unit CL1 by unlocking the lock. The storage unit CL1 may be a safe as will be explained later. The input unit CL2 is used to input biometric information such as a fingerprint to unlock the storage unit CL1. The registration unit CL3 registers biometric information such as fingerprints in advance.

The collator CLM collates the biometric information inputted into the input unit CL2 with the biometric information registered in the registration unit CL3. The controller CL5 unlocks the storage unit CL1 if the collation by the collator CL4 authenticate the biometric information inputted into the input unit CL2. When the storage unit CL1 is unlocked, the recorder CL6 records at least a person related to the authenticated biometric information.

The storage unit CL1 is unlocked according to biometric information such as a fingerprint inputted into the input unit CL2, and a person who input the biometric information is allowed, if authenticated, to take articles out of the storage unit CL1. The recorder CL6 records a person related to the biometric information authenticated by collation and a time when the storage unit CL1 is unlocked. This enables one to check when and by whom the storage unit CL1 was opened, to thereby surely control the storage unit CL1.

(First Embodiment)

Figure 2:
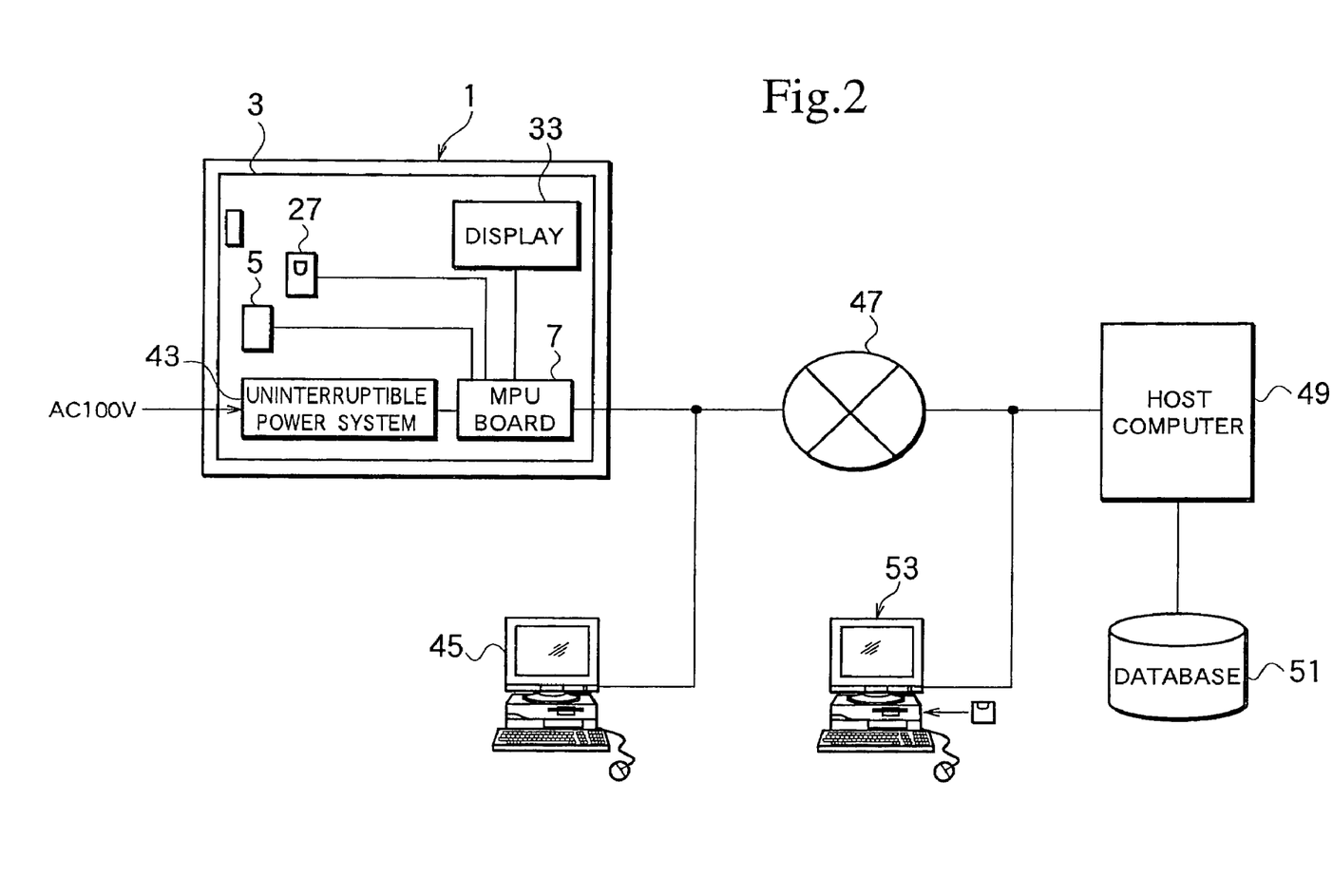
FIG. 2 is a block diagram showing an apparatus for controlling articles in custody according to a first embodiment of the present invention.

FIG. 2 is a block diagram showing an apparatus for controlling articles in custody according to a first embodiment of the present invention. A safe 1 in FIG. 2 serves as the storage unit CL1 of FIG. 1. The apparatus of the present invention is applicable to control a plurality of safes arranged in an area or distributed in different areas. The safe 1 has a door 3, which is lockable and unlockable with an electronic lock 5. The lock 5 is connected to an MPU board 7, which sends signals to lock and unlock the lock 5. The MPU board 7 serves as the controller CL5 of FIG. 1.

Figure 3:
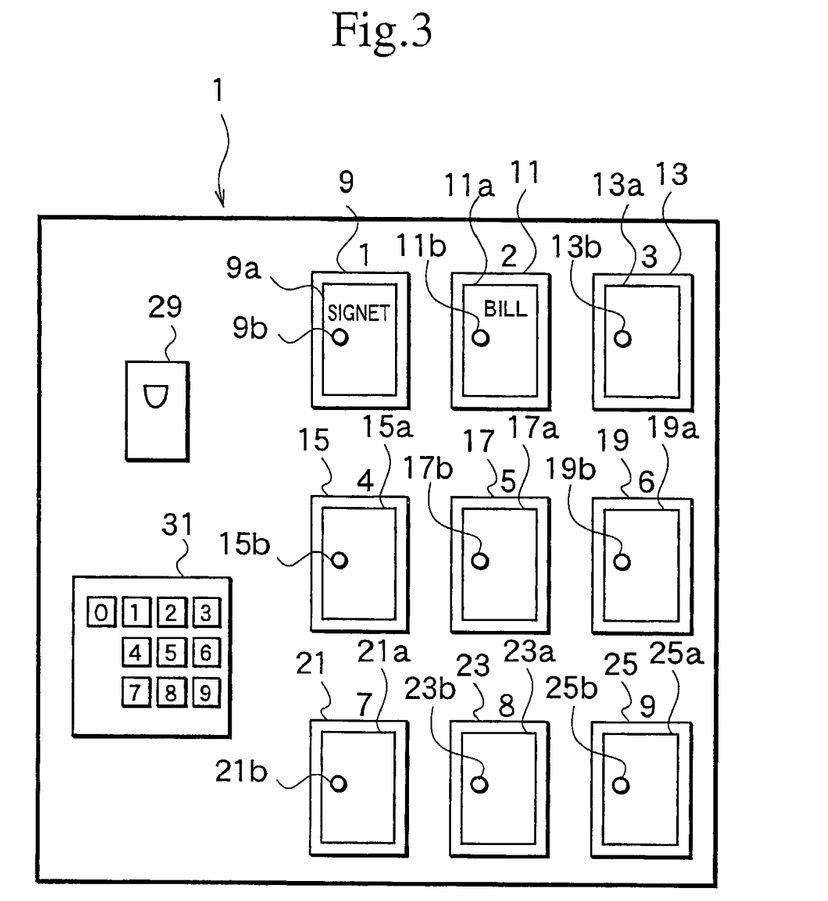
FIG. 3 is a front view showing an opened state of a safe according to the first embodiment.

FIG. 3 shows inner storage spaces 9, 11, 13, 15, 17, 19, 21, 23, and 25 defined in the safe 1. The storage spaces 9 to 25 are visible when the door 3 is opened. The storage spaces 9 to 25 have doors 9a, 11a, 13a, 15a, 17a, 19a, 21a, 23a, and 25a, respectively, which are provided with electronic locks 9b, 11b, 13b, 15b, 17b, 19b, 21b, 23b, and 25b, respectively, to keep articles in the storage spaces 9 to 25. The articles in the storage spaces 9 to 25 are, for example, signets, bills, and cash. The numbers of the inner storage spaces, the doors thereof, and the electronic locks thereof are optional according to the present invention.

The locks 9b to 25b are selectively unlockable to selectively open the doors 9a to 25a, to thereby selectively take out the articles such as signets and bills kept in the inner storage spaces 9 to 25. The locks 9b to 25b are individually connected to the MPU board 7 and are locked and unlocked in response to signals from the MPU board 7 serving as the controller CL5 of FIG. 1.

The safe 1 has an outer input unit 27 forming a part of the input unit CL2 of FIG. 1. The outer input unit 27 is used to input biometric information for unlocking the electronic lock 5 on the door 3. The outer input unit 27 is connected to the MPU board 7. Inside the safe 1, there is an inner input unit 29 forming a part of the input unit CL2 of FIG. 1. The inner input unit 29 is used to input biometric information for unlocking the electronic locks 9b to 25b.

According to the first embodiment, the biometric information may be a fingerprint of the index finger of a person who is authorized or registered to open the safe 1. The biometric information may be information concerning the eye, face, DNA, voice, or veins on the back of a hand of a person who is authorized or registered to open the safe 1. The safe 1 incorporates a ten-key pad 31 serving as a selector to select one of the inner storage spaces 9 to 25. The ten-key pad 31 is connected to the MPU board 7.

The MPU board 7 collates biometric information inputted into the outer input unit 27 or into the inner input unit 29 with registered biometric information. Namely, the MPU board 7 serves also as the collator CL4 of FIG. 1. If the biometric information inputted into the outer input unit 27 is authenticated by collation, the MPU board 7 provides a signal to unlock the electronic lock 5 and open the door 3. If the biometric information inputted into the inner input unit 29 is authenticated by collation and if the ten-key pad 31 has been manipulated to select one of the inner storage spaces 9 to 25, the MPU board 7 sends a signal to unlock one of the electronic locks 9b to 25b corresponding to the selected inner storage space.

Figure 4:
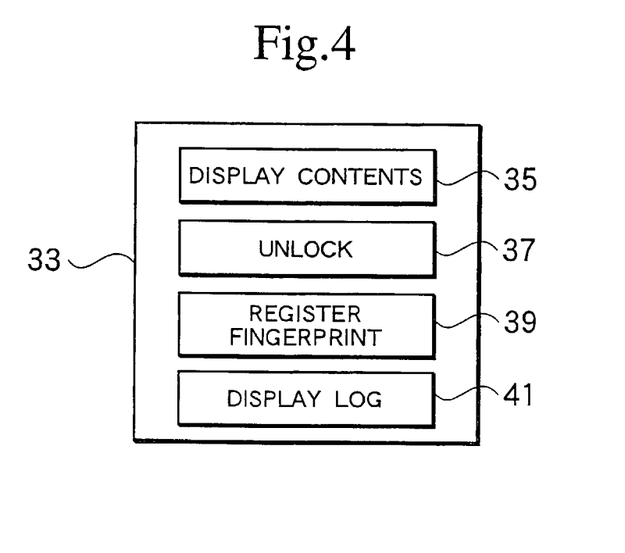
FIG. 4 shows an example of a display according to the first embodiment.

The safe 1 has a display 33 on a front face of the door 3. FIG. 4 shows an example of an initial screen displayed on the display 33. The display 33 serves as a touch panel, and the initial screen shown in FIG. 4 includes menu items to be touched. The display 33 may display other menus and information pieces. If a contents display menu 35 is touched, the details of articles kept in the inner storage spaces 9 to 25 are separately displayed on the display 33. If an unlock menu 37 is touched, an operation menu for unlocking the electronic lock 5 is displayed. If a fingerprint registration menu 39 is touched, a menu is displayed to allow a person to use the outer input unit 27 and register a fingerprint of the person. If a log display menu 41 is touched, the number and name of each person who opened the door 3 of the safe 1 and took out articles, a time the person unlocked the safe 1, and the details of the articles taken out are displayed on the display 33. If a fingerprint is input, the fingerprint itself will be displayed on the display 33, to allow the person who input the fingerprint to check the fingerprint.

In FIG. 2, the MPU board 7 is connected to an uninterruptible power system (UPS) 43, which supplies power to the MPU board 7.

The MPU board 7 is connected to a terminal 45 through, for example, a LAN. The terminal 45 is used to, for example, monitor logs. The MPU board 7 is also connected to a host computer 49 through, for example, a telephone line 47 and a WAN.

The host computer 49 has a database 51 that stores information concerning authorized or registered persons that control the safe 1. This information may include the names, ages, addresses, and fingerprints of the persons. The database 51 is updated whenever a person is newly registered or whenever a registered person becomes unauthorized, so that the database 51 may keep the latest information. The MPU board 7 is also connected to a terminal 53 through the telephone line 47. The terminal 53 is used to, for example, monitor logs.

Figure 5:
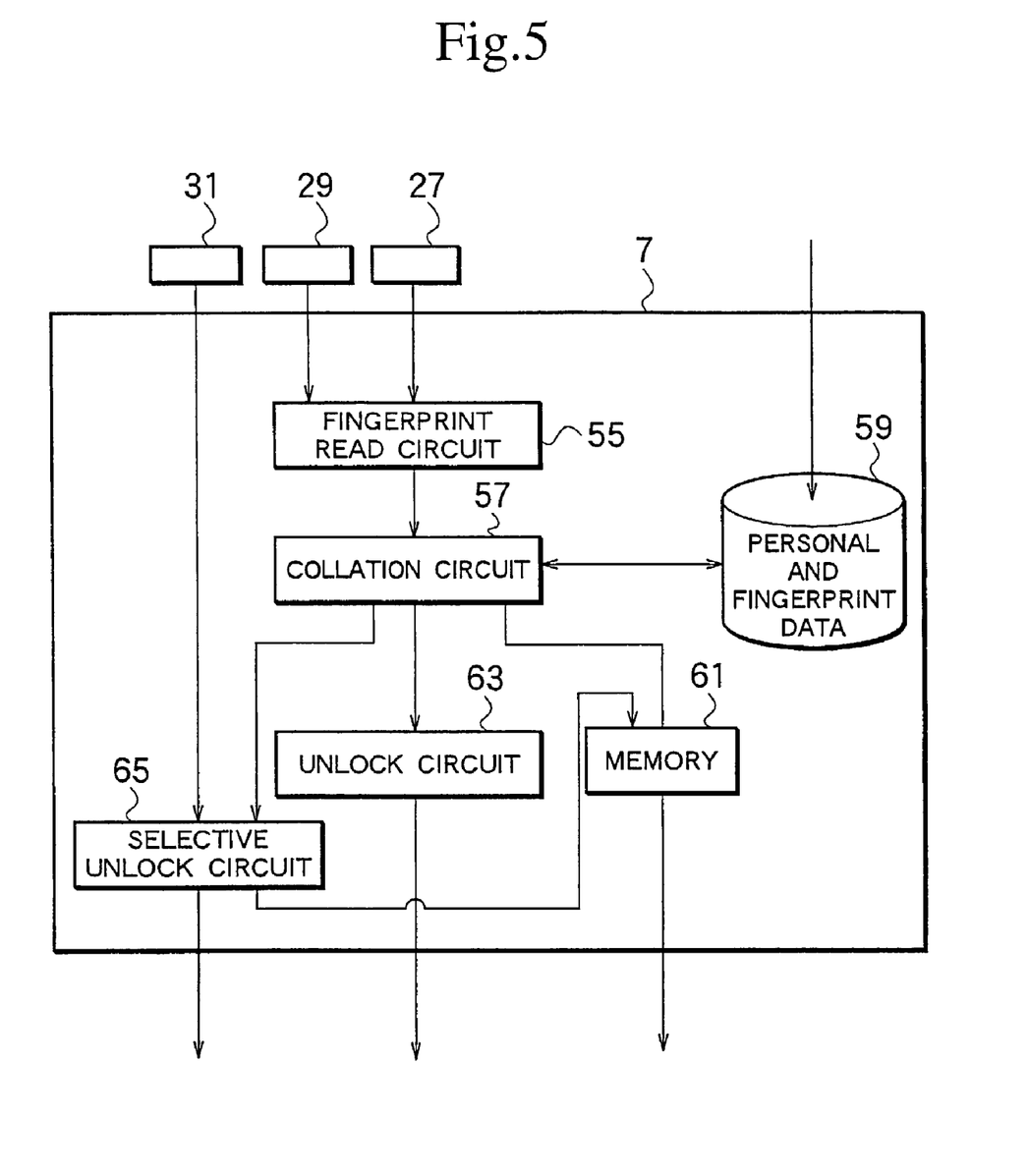
FIG. 5 is a block diagram showing an MPU board according to the first embodiment.

FIG. 5 shows the details of the MPU board 7. The MPU board 7 includes a read circuit 55 to read biometric information, i.e., fingerprints in this embodiment, a collation circuit 57, data 59 on fingerprints and registered persons, a memory 61, an unlock circuit 63, and a selective unlock circuit 65.

The read circuit 55 forms, together with the outer input unit 27 and inner input unit 29, the input unit CL2 of FIG. 1. The read circuit 55 reads a fingerprint inputted into the input unit 27 or 29. The collation circuit 57 corresponds to the collator CL4 of FIG. 1. The collation circuit 57 reads registered information from the data 59, collates the read information with the fingerprint read by the read circuit 55, and identifies the person who input the fingerprint.

The data 59 corresponds to the registration unit CL3 of FIG. 1. Information on registered persons and their fingerprints are stored as the data 59 in advance. The data 59 may be downloaded from, for example, the database 51 of FIG. 2. Alternatively, the data 59 may be stored in each safe 1.

The unlock circuit 63 corresponds to the controller CL5 of FIG. 1. If a person who has input a fingerprint into the outer input unit 27 is authenticated by collation in the collation circuit 57, the unlock circuit 63 sends a signal to unlock the electronic lock 5.

If a person who has input a fingerprint into the inner input unit 29 is authenticated by collation in the collation circuit 57 and if one of the inner storage spaces 9 to 25 is selected through the ten-key pad 31, the selective unlock circuit 65 sends a signal to unlock one of the electronic locks 9b to 25b corresponding to the selected inner storage space.

The memory 61 corresponds to the recorder CL6 of FIG. 1. The memory 61 records the authenticated person who unlocked the selected inner storage space. Namely, the memory 61 records, the name, personal number, and age of the person, the time when the storage space was unlocked, and the articles taken out by the person from the storage space. Types of the articles kept in the inner storage spaces 9 to 25 are determined in advance, and the type of the articles in the unlocked storage space is automatically recorded in the memory 61.

Figure 6:
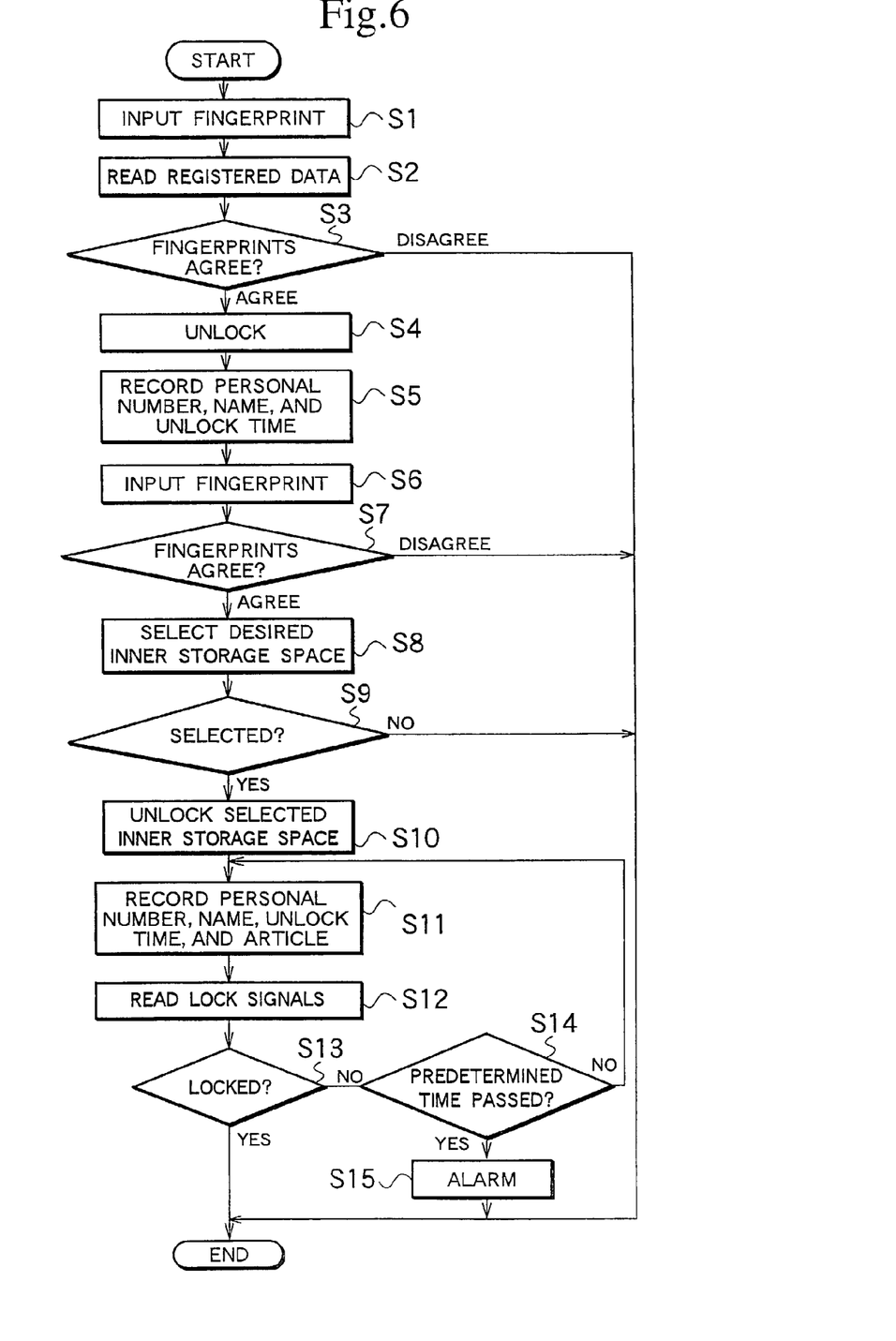
FIG. 6 is a flowchart showing an operation according to the first embodiment.

FIG. 6 is a flowchart showing an operation according to the first embodiment. Step S1 carries out a fingerprint input operation to open the door 3. A person uses the outer input unit 27 and inputs his or her fingerprint. Step S2 reads personal and fingerprint information from the data 59.

Step S3 collates the fingerprint read by the read circuit 55 with each of the fingerprints read from the data 59. If the fingerprints agree with each other, step S4 is carried out, and if not, the flow ends to allow only registered persons to open the door 3 of the safe 1.

Step S4 carries out an unlock operation. In response to the agreement signal from the collation circuit 57, the unlock circuit 63 sends a signal to unlock the electronic lock 5 to open the door 3.

Step S5 records the number and name of the person in question and a time when the door 3 was unlocked into the memory 61. The recording operation is carried out according to the signal from the collation circuit 57 and a signal from a timer (not shown).

Step S6 again carries out a fingerprint input operation in the situation that the door 3 of the safe 1 opened. This fingerprint input operation is carried out by putting, for example, the index finger of a person to open the door of one of the inner storage spaces 9 to 25 on the inner input unit 29.

Step S7 carries out a fingerprint collation operation. This operation is the same as that of step S3. If the fingerprint from the read circuit 55 agrees with one of the fingerprints read from the data 59, step S8 is carried out, and if not, the flow ends to allow only registered persons to open the inner storage spaces 9 to 25.

Step S8 carries out a selection operation. The person authenticated by the collation operation manipulates the ten-key pad 31 and enters a number corresponding to a desired one of the inner storage spaces 9 to 25.

Step S9 determines whether or not a storage space number has been entered through the ten-key pad 31. If it has been entered, step S10 is carried out, and if not, the flow ends. Even if the door 3 of the safe 1 is opened, the flow ends unless one of the inner storage spaces 9 to 25 is selected. It is possible to ask the authenticated person to input a password with the ten-key pad 31 and then input a number corresponding to one of the inner storage spaces 9 to 25. If no correct password is input, step S9 may terminate the flow. This improves the secure management of the safe 1.

Step S10 carries out a selective unlock operation. In response to signals from the collation circuit 57 and ten-key pad 31, the selective unlock circuit 65 sends a signal to unlock the electronic lock of the selected inner storage space. As a result, the authenticated person can take desired articles such as signets and bills from the selected inner storage space.

Step S11 records, in the memory 61, the number and name of the authenticated person, a time when the selected inner storage space was unlocked, and the articles in the selected inner storage space, according to the signals from the collation circuit 57, selective unlock circuit 65, and timer (not shown).

The recorded data can easily be monitored on the terminals 45 and 53 of FIG. 2. According to the embodiment, any registered person can take articles out of the safe 1 with a simple operation of inputting his or her fingerprint. With the terminals 45 and 53, one can easily check who and when articles were taken out of the safe 1. This ensures the secure management of the safe 1.

Step S12 reads lock signals that are transmitted when the electronic lock 5 on the door 3 and the electronic locks 9b to 25b on the inner storage spaces 9 to 25 are locked.

Step S13 determines whether or not the door 3 and inner storage spaces 9 to 25 have been locked. If they have been locked, the flow ends, and if not, step S14 checks to see if a predetermined period has passed. The predetermined period is set according to a time needed to open the safe 1, take articles from the safe 1, and close the safe 1 plus a margin. The predetermined period is optional and is, for example, five minutes.

If step S14 determines that the predetermined period has not passed yet, step S11 is repeated to continue the record operation. If step S14 determines that the predetermined period has passed, step S15 makes an alarm by, for example, sounding a buzzer and terminates the flow. Hearing the buzzer, the person who opened the safe 1 is prompted to lock the safe 1. The alarm is issued if the door 3 of the safe 1 or any one of the inner storage spaces 9 to 25 is left open, to surely close and lock them.

According to the first embodiment, both the outer input unit 27 and inner input unit 29 are employed. It is possible to employ only one of them. If only the inner input unit 29 is employed, the door 3 may be provided with a mechanical lock having a dial. Only the outer input unit 27 may be employed without the inner input unit 29 and ten-key pad 31. When any one of the inner storage spaces 9 to 25 is opened, a signal is sent to record a person who opened the inner storage space, a time of the opening of the inner storage space, and articles taken out by the person.

According to the first embodiment, steps S5 and S11 carry out the recording operation. Even if the person who opened the door 3 differs from the person who opened one of the inner storage spaces 9 to 25, steps S5 and S11 correctly record the persons, to ensure the secure management of the safe 1. It is possible to omit step S5.

According to the first embodiment, any authorized or registered person is allowed to open any one of the inner storage spaces 9 to 25. It is possible to differ unlockable inner storage spaces depending on persons by using passwords. For example, an inner storage space storing most important articles may be unlockable only by a responsible person.

(Second Embodiment)

Figure 7:
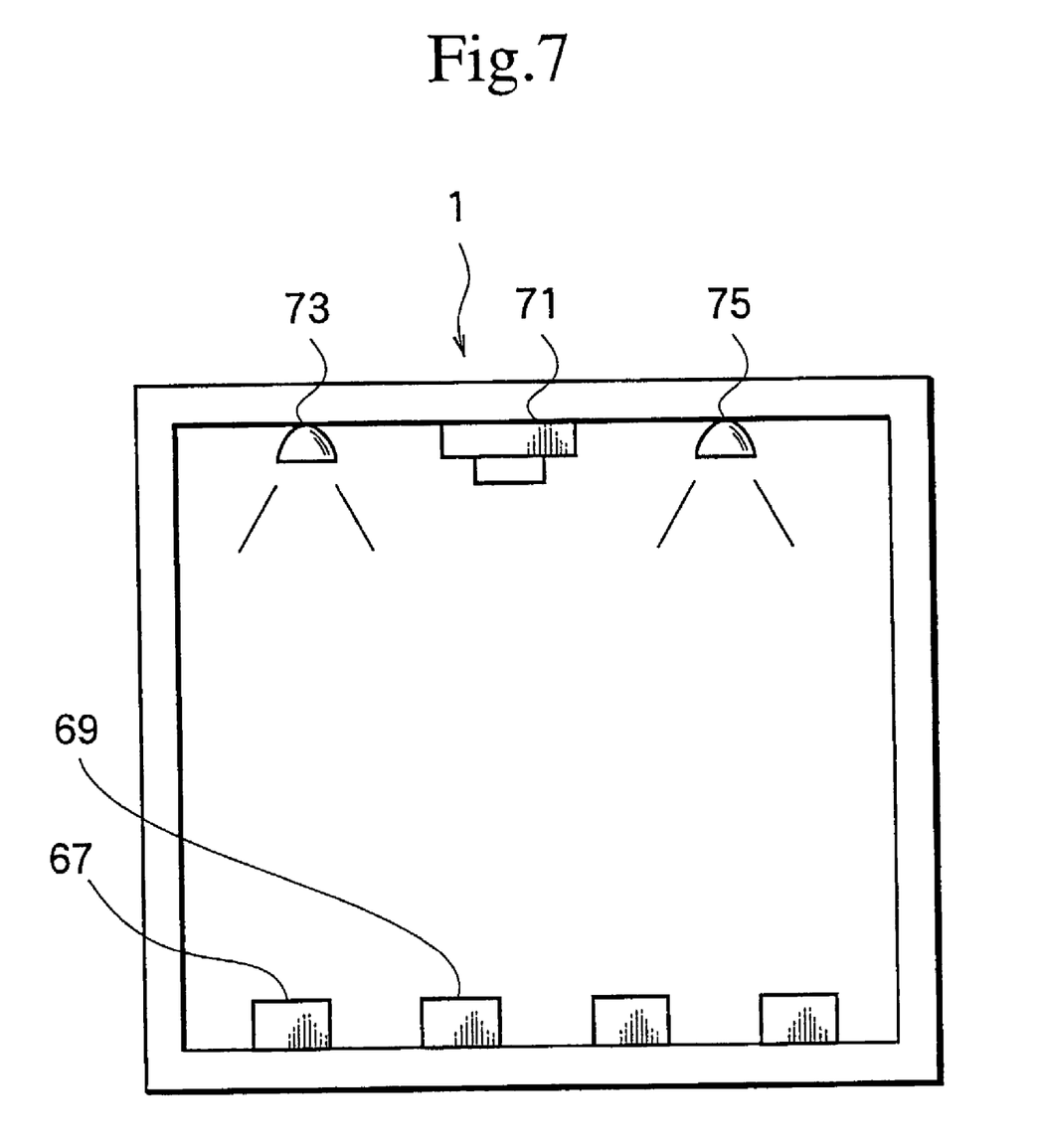
FIG. 7 is a front view showing a safe with a door omitted, according to a second embodiment of the present invention.
Figure 8:
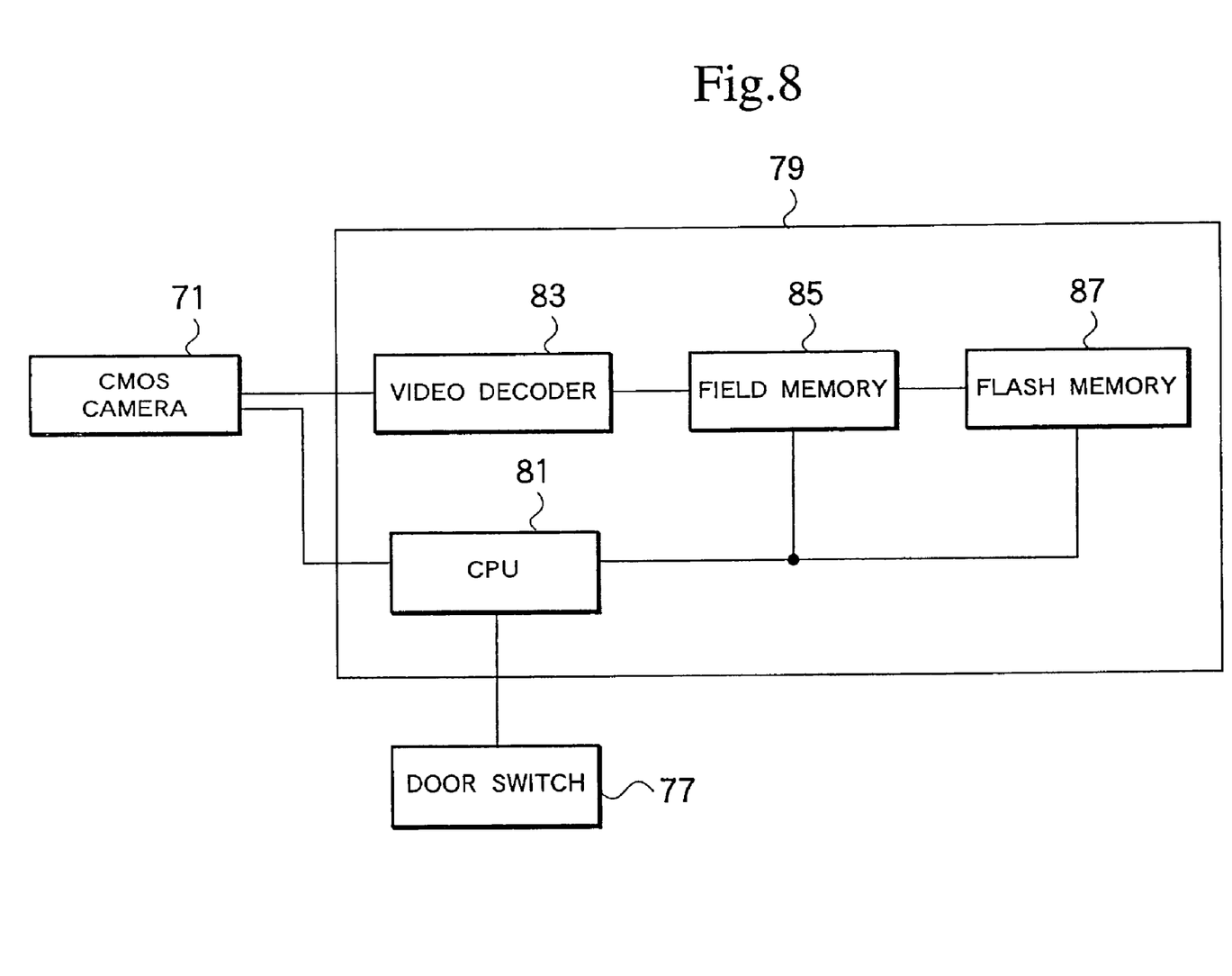
FIG. 8 is a block diagram showing an image recorder according to the second embodiment.
Figure 9:
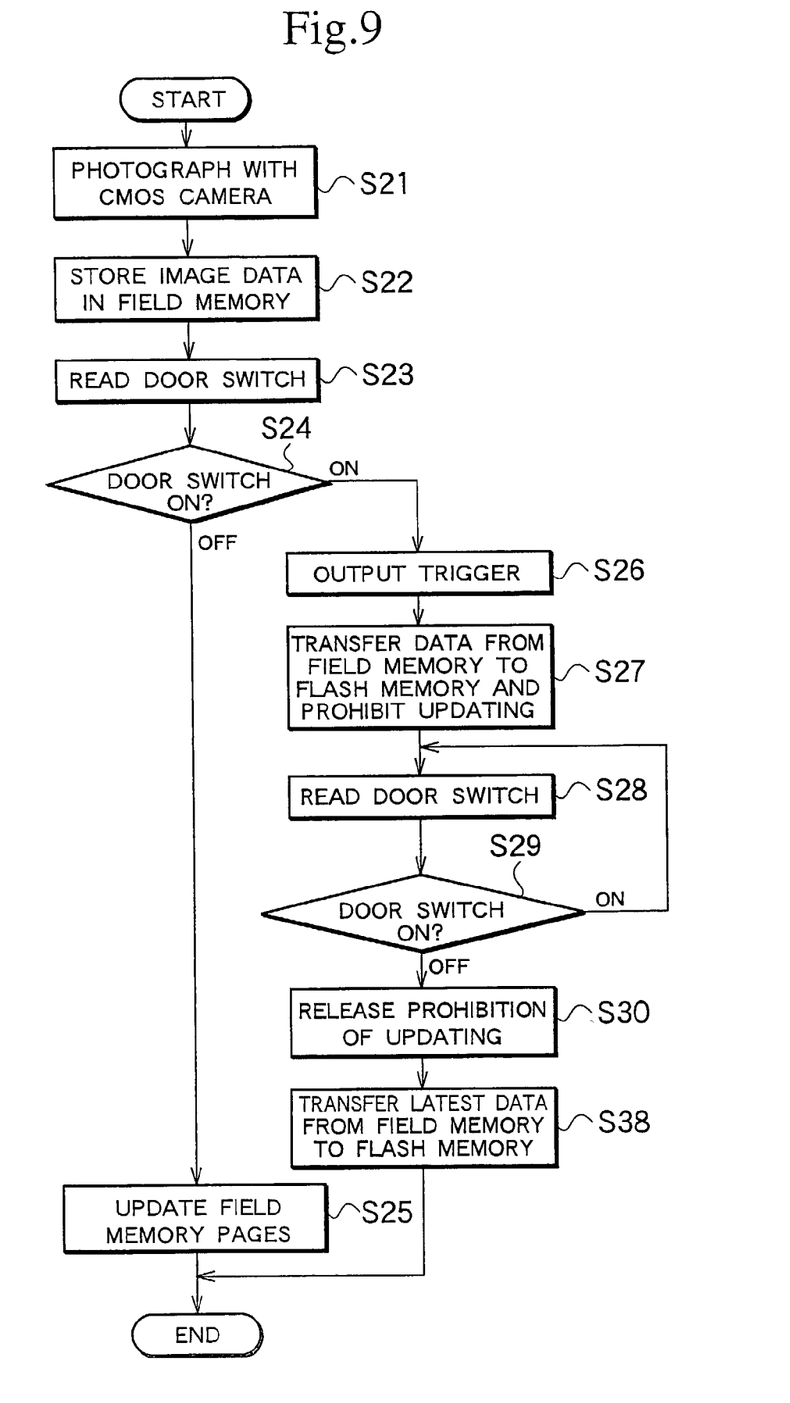
FIG. 9 is a flowchart showing an operation according to the second embodiment.

FIGS. 7, 8, and 9 show an apparatus for controlling articles in custody according to the second embodiment of the present invention. The apparatus involves a safe 1 and visually monitors and records the inside state of the safe 1. In FIG. 7, the door of the safe 1 is not shown. According to the second embodiment, the safe 1 has no inner storage spaces and directly stores articles 67 and 69. The safe 1 may have inner storage spaces each provided with a camera to monitor and record the images of articles stored therein.

The door 3 (not shown) of the safe 1 is constituted like the first embodiment. Namely, the door 3 has an electronic lock 5, an outer input unit 27, and a display 33. The safe 1 has an MPU board 7 connected to the parts 5, 27, and 33 and an uninterruptible power system 43.

According to the second embodiment, an inner top wall of the safe 1 has a photograph unit such as a CMOS camera 71 and lighting units 73 and 75. The safe 1 has a door switch 77 (FIG. 8). The CMOS camera 71 is connected to an image recorder 79 (FIG. 8). The image recorder 79 includes a CPU 81, a video decoder 83, a field memory 85, and a flash memory 87.

The CMOS camera 71 photographs the articles 67 and 69 in the safe 1. It may employ a CCD camera or the like as photograph unit instead of the CMOS camera 71.

The CPU 81 processes signals. The field memory 85 receives image data photographed by the CMOS camera 71 through the video decoder 83 and stores a predetermined number of images, which are updated from time to time. In response to a trigger signal from the door switch 77, the flash memory 87 stores image data transferred from the field memory 85. The flash memory 87 serves as image record unit.

FIG. 9 is a flowchart showing an operation according to the second embodiment. In step S21, the CMOS camera 71 photographs images. Namely, the lighting units 73 and 75 illuminate the inside of the safe 1, and the CMOS camera 71 photographs the articles 67 and 69 stored in the safe 1.

Step S22 stores the photographed image data in the field memory 85. Namely, signals from the CMOS camera 71 are processed into digital signals through a CDS circuit, an AGC circuit, and I/D converter. This signal processing includes a code signal process, a color signal process, a contour correction process, and an encode process. The processed signals are converted into analog code signals and chromatic signals.

Step S23 reads an ON/OFF signal from the door switch 77 of the safe 1. Step S24 determines whether or not the door switch 77 is ON. If the door switch 77 is ON to indicate that the door of the safe 1 is open, step S26 is carried out, and if OFF, step S25 is carried out.

Step S25 updates pages of the field memory 85, so that the field memory 85 may store a predetermined number of latest images and so that the inside state of the safe 1 may always be visually monitored with the terminals 45 and 53 (FIG. 2).

In step S26, a trigger signal is issued due to the ON state of the door switch 77. In step S27, the CPU 81 transfers data from the field memory 85 to the flash memory 87 and prohibits the updating of the stored data. The flash memory 87 stores the transferred data.

Step S28 reads a signal from the door switch 77. Step S29 determines whether or not the door switch 77 is ON. If the door of the safe 1 is closed to turn off the door switch 77, step S30 is carried out, and if the door switch 77 is still ON, step S28 is repeated.

Step S30 releases the prohibition of memory updating, so that the field memory 85 may be updated. Step S38 transfers latest image data from the field memory 85 to the flash memory 87, and the flash memory 87 keeps the transferred image data. One can monitor images taken and recorded when the safe 1 was opened and when the safe 1 was closed thereafter, to check changes in the articles 67 and 69 in the safe 1.

In this way, the states of the articles 67 and 69 in the safe 1 can always be monitored on the terminals 45 and 53. If the door of the safe 1 is opened and the articles 67 and 69 are taken out of the safe 1, images at the moments are recorded. With such images and fingerprints recorded as mentioned above, it is easy to know who has taken out the articles and which of the articles 67 and 69 have been taken out. The second embodiment is capable of directly monitoring the storage states of the articles 67 and 69 with the images thereof, to further ensure the secure management of the safe 1 in addition to providing the effects of the first embodiment.

According to the second embodiment, the CMOS camera 71 photographs the articles 67 and 69 in the safe 1. It is also possible to photograph the face of a person who opens the safe 1. In this case, a CMOS camera dedicated to this purpose may be employed.

(Third Embodiment)

Figure 10:
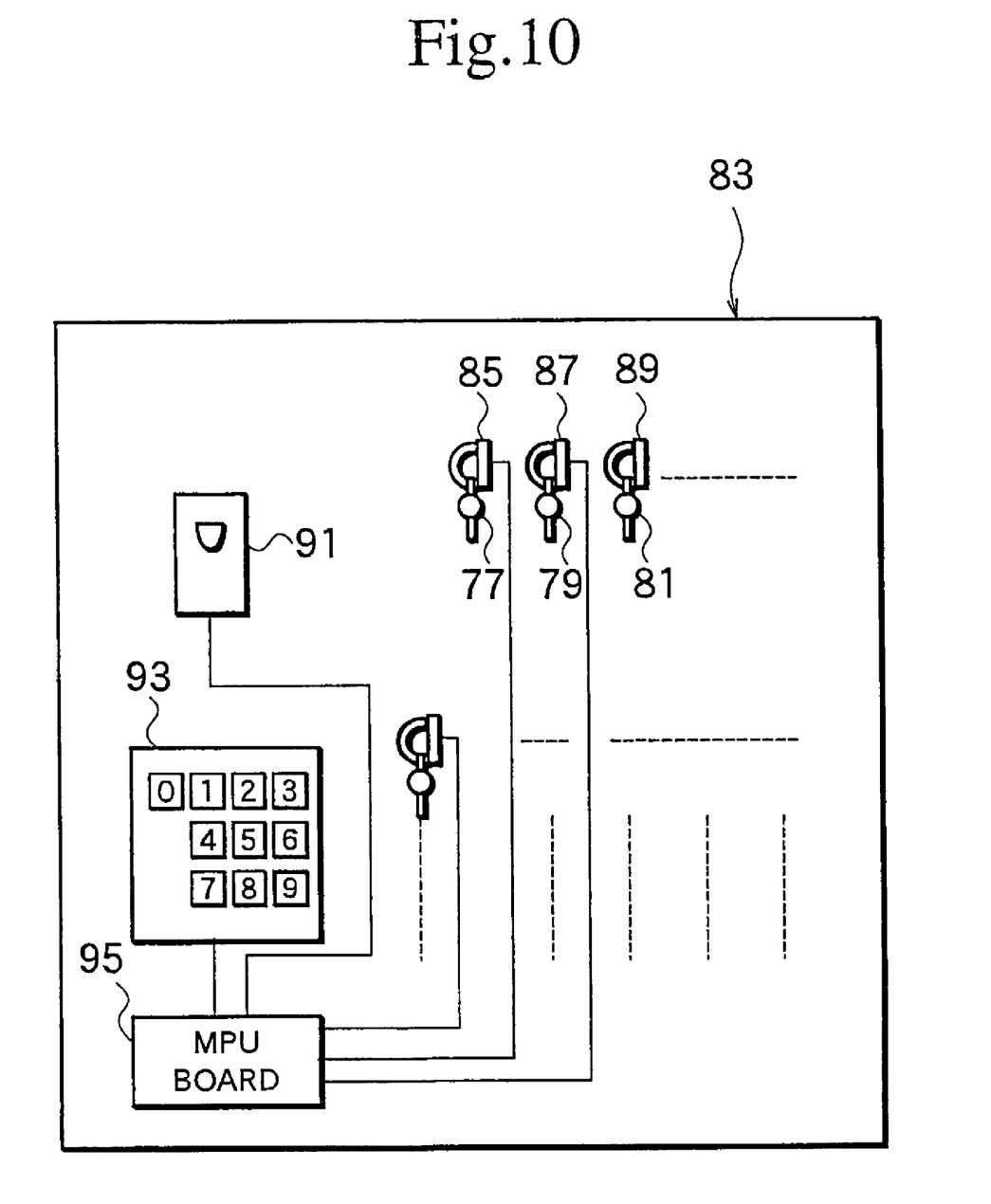
FIG. 10 is a front view showing a key storage unit according to a third embodiment of the present invention.
Figure 11:
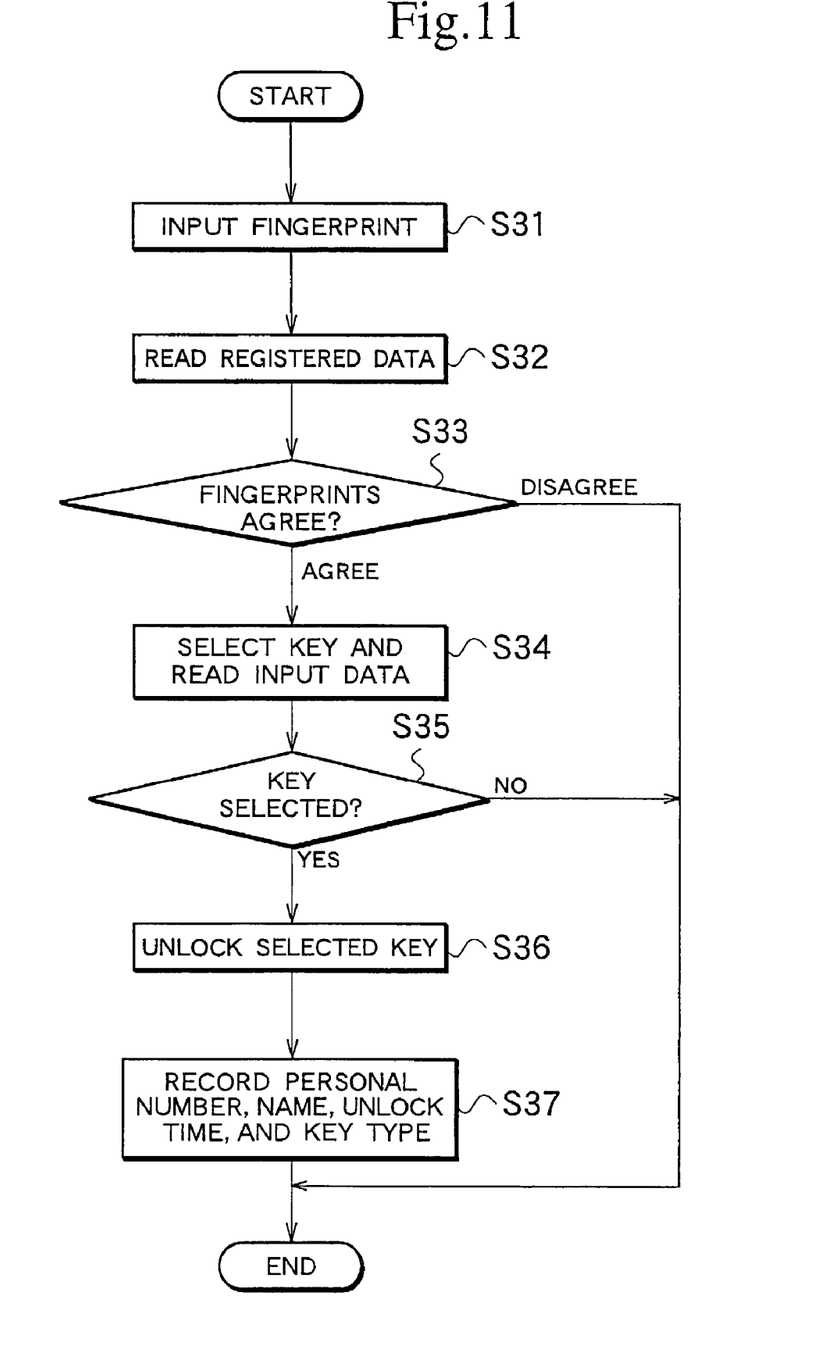
FIG. 11 is a flowchart showing an operation according to the third embodiment.

FIGS. 10 and 11 show an apparatus for controlling articles in custody according to the third embodiment of the present invention, in which FIG. 10 is a front view showing a storage unit according to the third embodiment and FIG. 11 is a flowchart showing an operation according to the third embodiment. According to the third embodiment, a key storage unit 83 serves as the storage unit CL1 of FIG. 1 to control keys 77, 79, and 81. Although the number of the keys in FIG. 10 is three, the present invention is applicable to control an optional number of keys. The key storage unit 83 locks the keys and selectively unlocks the keys so that the keys may selectively be taken out.

The key storage unit 83 has electronic lock hooks 85, 87, and 89 to keep the keys 77, 79, and 81, respectively. Although the number of the electronic lock hooks in FIG. 10 is three, the number is optional and is determined according to the number of keys to control. The key storage unit 83 also has an input unit 91 to input biometric information such as a fingerprint and a ten-key pad 93 serving as a selector to select one of the keys.

The input unit 91 has the same structure as the outer input unit 27 of the first embodiment and is connected to an MPU board 95. The ten-key pad 93 has the same structure as the ten-key pad 31 of the first embodiment and is connected to the MPU board 95. The output of the MPU board 95 is connected to the hooks 85 to 89. The MPU board 95 serves as the controller CL5 of FIG. 1. The MPU board 95 collates biometric information inputted into the input unit 91 with registered biometric information. If the input biometric information is authenticated by collation and if the ten-key pad 93 has been manipulated to select one of the keys 77 to 81, the MPU board 95 unlocks one of the hooks 85 to 89 corresponding to the selected key. Like the first embodiment, the MPU board 95 is connected to an uninterruptible power system.

FIG. 11 is a flowchart showing an operation according to the third embodiment. Steps S31, S32, and S33 correspond to steps S1, S2, and S3 of the first embodiment of FIG. 6. If step S33 authenticates input biometric information by collation, step S34 is carried out, and if not, the flow ends. Step S34 reads a key number of one of the keys 77 to 81 selected through the ten-key pad 93. Like the first embodiment, it is possible to input a password and then select one of the keys 77 to 81 with the ten-key pad 93.

Step S35 determines whether or not one of the keys 77 to 81 has been selected. If one of the keys has been selected, step S36 is carried out, and if not, the flow ends. Like the first embodiment, the flow ends if biometric information is input without selecting a key through the ten-key pad 93. If a password is required, the flow terminates unless the password is input even if one of the keys 77 to 81 is selected.

Step S36 unlocks the selected key. If the input biometric information is authenticated and if one of the keys 77 to 81 is selected, the MPU board 95 unlocks one of the hooks 85 to 89 corresponding to the selected key, so that the selected key may be taken out.

Step S37 records the number and name of a person related to the authenticated biometric information, a time when one of the hooks 85 to 89 corresponding to the selected key is unlocked, and the type of the key taken out. Like the first embodiment, the MPU board 95 records these pieces of information according to an unlock signal sent from the selected hook.

The third embodiment is capable of grasping a time when any one of the keys 77 to 81 is taken out, a person who takes the key, and the type of the key taken out. According to the third embodiment, any registered person can easily take out a desired one of the keys 77 to 81 only by inputting his or her biometric information such as a fingerprint and by manipulating the ten-key pad 93 to select the desired key.

What is claimed is:

1. An apparatus for controlling articles in custody. comprising:
   a storage compartment structure in the form of a box having an inside defining an interior compartment, said box having movably attached thereto a lockable outer door for closing said interior compartment to secure the articles within the interior compartment of the box and unlockable to allow the articles to be taken out therefrom;
   an input unit to input biometric information for unlocking the storage compartment structure;
   a registration unit to register biometric information in advance;
   a collation unit to collate the input biometric information with the registered biometric information;
   a controller to unlock the storage means if the collation byte collation unit authenticates the input biometric information;
   a record unit to record at least a person related to the authenticated biometric information in response to the unlocking of the storage compartment structure;
   the storage compartment structure forming a plurality of inner storage spaces, in the interior compartment of the storage compartment structure, each being lockable to keep articles therein and selectively unlockable to allow the articles to be taken out therefrom;
   the outer door openable to visibly expose the inner storage spaces to outside said storage structure;

the input unit including an outer input to input biometric information for unlocking the outer door, the outer input being disposed on an exterior of the outer door and exposed a person seeking to open the outer door when the outer door is closed;

the input unit including an inner input in an interior of the storage compartment structure to input biometric information for unlocking the inner storage spaces, the inner input unit being provided within the inside of box so as to be exposed to the person when the outer door is opened;

a selection input unit disposed within said interior compartment for selecting any one of the inner storage spaces, said selection input unit accepting selection data input by the person for the purpose of opening any one of said inner storage;

said inner storage spaces respectively have inner storage space doors which are unlockable by the input unit and movably supported by the storage compartment structure;

the controller including an outer control unit to unlock the outer door if the biometric information inputted into the outer input means is authenticated by collation and an inner control unit to unlock the inner storage space door of the selected inner storage space if the biometric information inputted into the inner input is authenticated by collation and if the inner storage space is selected through the selection input;and the selection data selecting one of said inner storage spaces from amongst all said inner storage spaces which is unlocked in response to receipt and collation of the input biometric information inputted to said inner input.

2. The apparatus of claim 1, wherein the record also records a time when the storage compartment structure is unlocked.

3. The apparatus of claim 1, wherein the storage compartment structure is a safe.

4. The apparatus of claim 1, wherein:

said inner storage space doors are arranged supported on an area of an inner wall of said storage compartment structure within said interior compartment; and said inner input and said selection input unit are disposed on said inner wall at a position adjacent said area of said inner wall.

5. The apparatus of claim 4, wherein the outer control unit includes a timer device and an alarm device wherein the timer device activates the alarm device to emit an alarm when the outer door remains open longer than a predetermined time period.

6. The apparatus of claim 1, wherein the outer control unit includes a timer device and an alarm device wherein the timer device activates the alarm device to emit an alarm when the outer door remains open longer than a predetermined time period.

* * * * *